(12) United States Patent
Izardel

(10) Patent No.: US 9,458,970 B2
(45) Date of Patent: Oct. 4, 2016

(54) LAMP WITH LED LIGHT BULB

(71) Applicant: Lazar Izardel, Tel Aviv (IL)

(72) Inventor: Lazar Izardel, Tel Aviv (IL)

( * ) Notice: Subject to any disclaimer, the term of this patent is extended or adjusted under 35 U.S.C. 154(b) by 0 days.

(21) Appl. No.: 14/301,356

(22) Filed: Jun. 11, 2014

(65) Prior Publication Data

US 2015/0362137 A1 Dec. 17, 2015

(51) Int. Cl.
| | |
|---|---|
| *F21L 4/08* | (2006.01) |
| *F21K 99/00* | (2016.01) |
| *F21S 8/08* | (2006.01) |
| *F21S 9/03* | (2006.01) |
| *F21Y 101/02* | (2006.01) |
| *F21V 3/00* | (2015.01) |
| *F21Y 111/00* | (2016.01) |

(52) U.S. Cl.
CPC ............... *F21K 9/135* (2013.01); *F21S 8/088* (2013.01); *F21S 9/035* (2013.01); *F21K 9/10* (2013.01); *F21V 3/00* (2013.01); *F21Y 2101/02* (2013.01); *F21Y 2111/007* (2013.01)

(58) Field of Classification Search
CPC ............ F21S 9/03; F21S 9/032; F21S 9/035; F21S 9/037; F21L 4/08; F21L 4/085; F21L 4/027; F21K 9/135; F21K 9/1375; F21K 99/00; F21K 9/10; F21K 9/13; F21K 9/30; F21V 17/04

USPC ............................ 362/183, 249.02, 255, 256
See application file for complete search history.

(56) References Cited

U.S. PATENT DOCUMENTS

| | | | | |
|---|---|---|---|---|
| 4,759,735 | A * | 7/1988 | Pagnol et al. ................. | 136/246 |
| 2008/0232094 | A1* | 9/2008 | Ramsdell ....................... | 362/183 |
| 2013/0250543 | A1* | 9/2013 | Huang et al. .................. | 362/256 |
| 2013/0293083 | A1* | 11/2013 | Du et al. ......................... | 313/46 |
| 2013/0294082 | A1* | 11/2013 | Matsuda et al. .............. | 362/363 |
| 2014/0369037 | A1* | 12/2014 | Hsu et al. ................. | F21K 9/50 362/235 |

\* cited by examiner

*Primary Examiner* — Y M Lee
(74) *Attorney, Agent, or Firm* — Dekel Patent Ltd.; David Klein

(57) ABSTRACT

A lamp includes a light fixture mounted on a pole. The light fixture includes a transparent or translucent housing, and a solar energy collecting portion mounted on the light fixture. The solar energy collecting portion includes a top solar photovoltaic panel and side solar photovoltaic panels for collecting and converting incident solar energy to electricity. An electrical power source is mounted on the solar energy collecting portion. At least one LED light bulb is mounted on the base. The LED light bulb includes one or more LED lights mounted on a substrate provided with electrical wiring and housed in a transparent or translucent bulb enclosure. The substrate is mounted at one end of a slender stem.

11 Claims, 8 Drawing Sheets

LAMP WITH LED LIGHT BULB

FIELD OF THE INVENTION

The present invention relates generally to lamps, and particularly to a lamp with a light-emitting diode (LED) light bulb, such as for but not limited to, a street lamp or a garden lamp.

BACKGROUND OF THE INVENTION

Outdoor solar lamps are known, such as for streets or gardens. These lamps generally consist of one or more solar modules, electrical storage means for storing electrical energy connected to the solar module and one or more bulbs that are illuminated by solar power.

Incandescent light bulbs are disadvantageous for use in such lamps. One reason is that incandescent light bulbs draw significant power, and since the lamp must work all night, the light bulb may not provide enough light towards the end of the night. The lifetime of the bulb is also shortened.

Solid state devices, such as light emitting diodes (LEDs), have been used to replace conventional light sources such as incandescent, halogen and fluorescent lamps. LEDs have substantially higher light conversion efficiencies than incandescent and halogen lamps and longer lifetimes than all three of these types of conventional light sources. Some LEDs have higher conversion efficiencies than fluorescent light sources. LEDs require lower voltages than fluorescent lamps and contain no mercury or other potentially dangerous materials, therefore, providing various safety and environmental benefits.

However, the typical LED has a diffuse emission pattern that spans a hemispherical arc. This emission pattern may limit the use of LED light sources, or other solid state lighting devices, as replacements for conventional light sources for incandescent, halogen and fluorescent lamps, which emit light in all directions. An LED light source that is used in an incandescent light bulb, for example, may result in undesired dark spots in the downward direction.

SUMMARY OF THE INVENTION

The present invention seeks to provide an improved lamp with an LED light bulb, such as a solar powered LED light bulb, as is described more in detail hereinbelow.

There is thus provided in accordance with an embodiment of the present invention a lamp including a light fixture mounted on a pole, the light fixture including a transparent or translucent housing, a solar energy collecting portion mounted on the light fixture, the solar energy collecting portion including a top solar photovoltaic panel and side solar photovoltaic panels for collecting and converting incident solar energy to electricity, an electrical power source mounted on the solar energy collecting portion, and at least one LED light bulb mounted on the base, the base providing electrical connection from the solar photovoltaic panels to the electrical power source, and from the electrical power source to LED light bulb, wherein the at least one LED light bulb includes one or more LED lights mounted on a substrate provided with electrical wiring and housed in a transparent or translucent bulb enclosure, the substrate being mounted at one end of a slender stem, whose opposite end is mounted on an end portion of the light bulb, and wherein electrical wires are disposed through the stem to electrically connect the substrate and the LEDs to the electrical power source.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
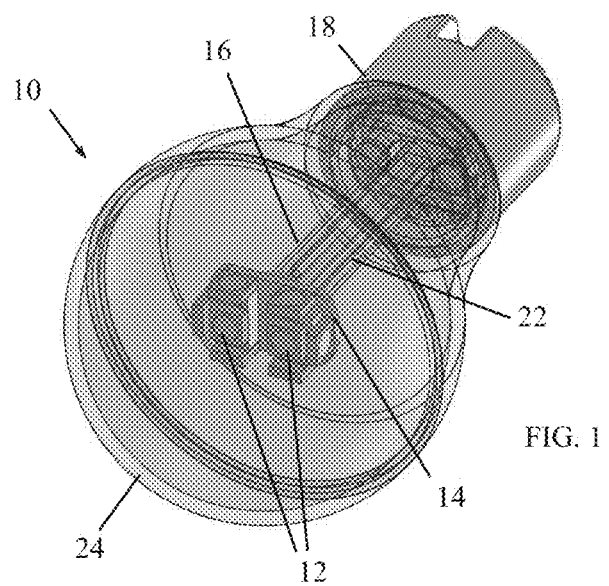
FIGS. 1-4 are simplified perspective illustrations of LED light bulbs, constructed and operative in accordance with different non-limiting embodiments of the present invention.

Reference is now made to FIGS. 1-4, which illustrate a LED light bulb 10, constructed and operative in accordance with an embodiment of the present invention.

The light bulb 10 includes one or more LED lights 12 mounted on a substrate 14 provided with electrical wiring (e.g., a printed circuit board (PCB)). Substrate 14 is mounted at one end of a slender stem 16, whose opposite end extends from an end portion of light bulb 10, such as a socket base 18. Socket base 18 has electrical contacts 20 (FIG. 4) for effecting electrical communication with an electrical power source (e.g., batteries, not shown here). Electrical wires 22 are disposed through stem 16 to electrically connect substrate 14 (and LEDs 12) to socket base 18 (and electrical contacts 20). Socket base 18 provides convenient electrical connection and allows easy replacement of the bulb. However, in an alternative embodiment, the light bulb 10 may be connected with no socket base and hard-wired to some base or motherboard in lamp 30 described below.

Light bulb 10 includes a transparent or translucent bulb enclosure 24 (e.g., fully transparent, semi-transparent, milky and others), which may be air-tight and water-proof, depending on the application. LED light bulb 10 thus mimics the structure of an incandescent light bulb. There is no need for filling the bulb enclosure 24 with inert gases or a making a vacuum therein. In an alternative embodiment, LED lights 12 are mounted on substrate 14 at the end of slender stem 16 with no bulb enclosure 24.

The LEDs 12 may be of any size, mcd rating, and color (e.g., white, red, green, blue, yellow or other non-white colors, or a RGB (red, green, blue) changing LED, or any combination thereof). "White" is defined as the color that has no or little hue, due to the reflection of all or almost all incident light. "White" in the specification and claims encompasses, bright white, warm white, "dirty" white, off-white, gray-white, snow white, hard-boiled-egg white and other shades of white. The colors of the lights may be programmed to change at predefined or random intervals, providing stunning lighting effects.

Figure 2:
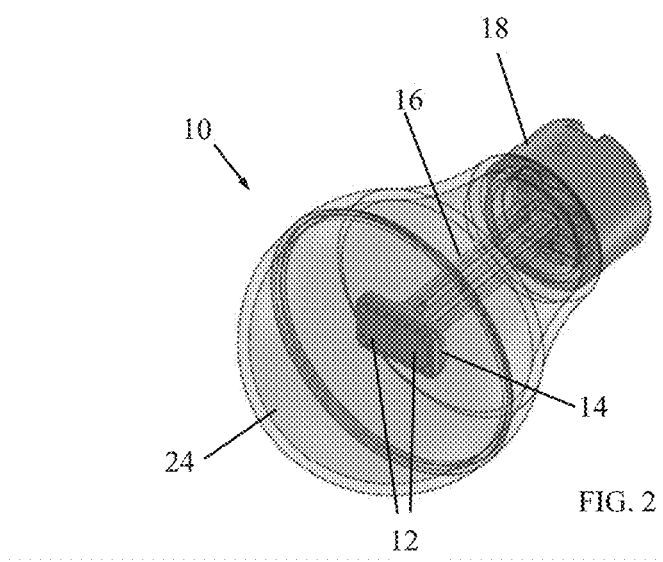
Figure 3:
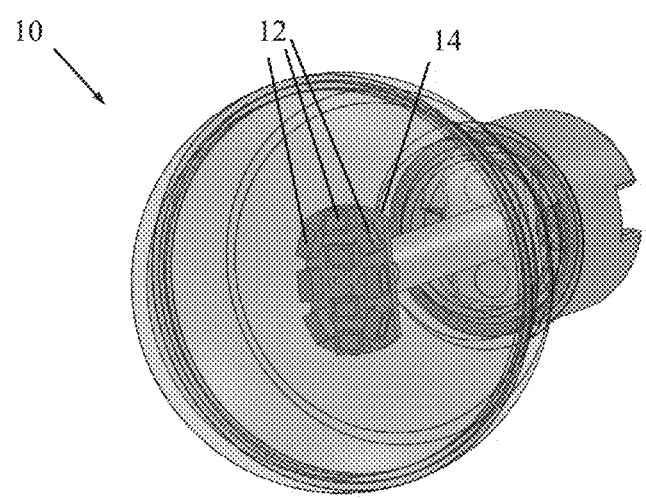
Figure 4:
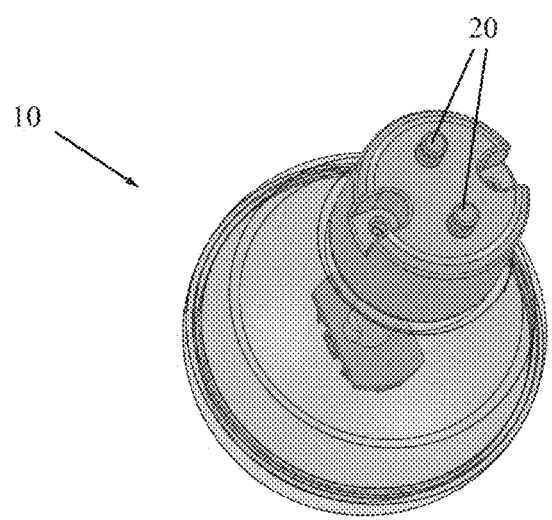
Figure 5:
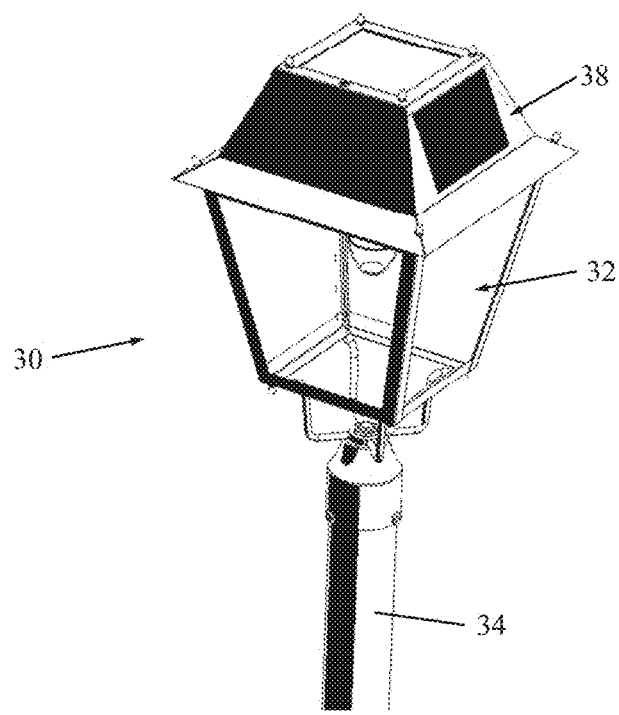
FIGS. 5 and 6 are simplified perspective and cutaway illustrations, respectively, of a lamp with LED light bulbs, constructed and operative in accordance with a non-limiting embodiment of the present invention.
Figure 6:
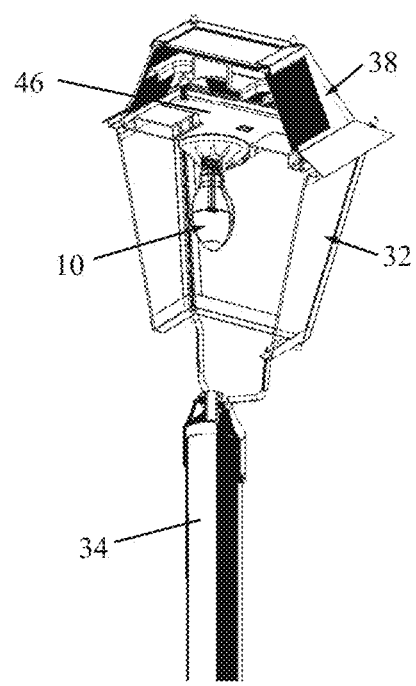
Figure 7:
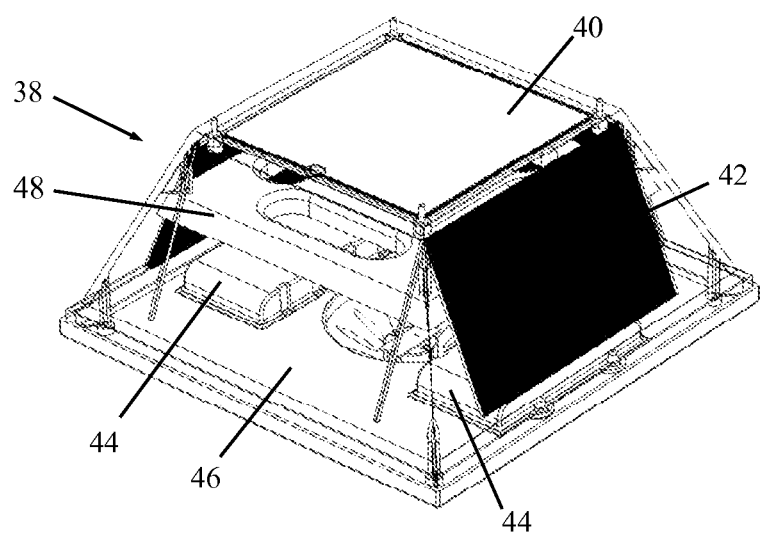
FIG. 7 is a simplified perspective illustration of a solar energy collecting portion of the lamp, constructed and operative in accordance with a non-limiting embodiment of the present invention.

The LEDs 12 may be distributed in any mounting pattern on substrate 14. FIGS. 1-3 illustrate three examples of mounting patterns on substrate 14 and the possibilities are virtually limitless. A preferred pattern is shown in FIG. 3. In this embodiment, there are four LED lights 12 mounted at the east, south, west and north positions, plus another four LED lights 12 mounted at the northeast, northwest, southeast and southwest positions. The northeast, northwest, southeast and southwest LED lights 12 are tilted approximately 45° to face the northeast, northwest, southeast and southwest directions, respectively. There may be an additional number (without limitation, two or three) of LED lights 12 mounted at the central portion of substrate 14. In the pattern of FIG. 3, light emanates omnidirectionally (360°) out from the light bulb, enhancing the luminescence of the bulb.

The invention is not limited to the number of LEDs or light bulbs, which may be of any size.

Reference is now made to FIGS. 5-8, which illustrate a lamp 30 with LED light bulbs 10, constructed and operative in accordance with a non-limiting embodiment of the present invention.

Lamp 30 includes a light fixture 32 mounted on a pole 34. Light fixture 32 includes a transparent or translucent housing 36 on top of which is mounted a solar energy collecting portion 38, shown more in detail in FIG. 7.

The solar energy collecting portion 38 includes a top solar photovoltaic panel 40 and (preferably, but not necessarily, four) side solar photovoltaic panels 42 for collecting and converting incident solar energy to electricity. The top solar photovoltaic panel 40 is generally horizontal, although it could be slanted to face the majority of the sunlight that impinges thereon during the day. The side solar photovoltaic panels 42 are slanted to face the majority of the sunlight that impinges thereon during the day. In one embodiment, the light fixture 32 is static and the side solar photovoltaic panels 42 constantly face in four different directions. In another embodiment, the light fixture 32 is mounted for rotation on pole 34 and a motor with solar sensors and control electronics (not shown) are provided for rotating light fixture 32 during the day hours so the solar energy is distributed more evenly among the side solar photovoltaic panels 42.

Figure 8:
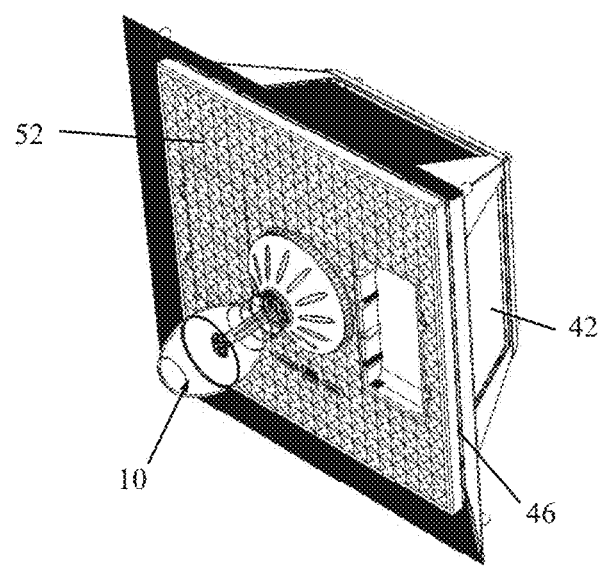
FIG. 8 is a simplified perspective illustration of an underside of the solar energy collecting portion, showing the mounting provision for the LEDs.

The electricity is stored in batteries 44 (FIG. 7) mounted at a base 46 of solar energy collecting portion 38. Base 46 may include a PCB for providing the electrical connection from the solar photovoltaic panels 40 and 42 to the batteries 44, and from batteries 44 to LEDs 12. As seen in FIG. 8, the LED light bulb 10 is mounted on an underside of base 46. (More than one light bulb may be used.) The mounting provisions for batteries 44 are indicated in FIG. 8. LED light bulb 10 faces downwards, so that its emission pattern is also correctly directed downwards for optimal illumination.

The LEDs 12 and batteries 44 may advantageously be low voltage, such as but not limited to, 3-4 V (e.g., batteries 44 may be lithium phosphate batteries). In this manner, the invention advantageously uses low power in a solar outdoor application, in contrast with prior art outdoor solar systems that use 12 V LEDs and higher voltage batteries with more complicated circuitry.

An intermediate substrate 48 may be disposed in solar energy collecting portion 38 between the top solar photovoltaic panel 40 and base 46. The intermediate substrate 48 may be used to mount further control electronics and sensors thereupon. It may also provide support for the solar photovoltaic panels. The intermediate substrate 48 may also serve as a thermal-insulating barrier between the top solar photovoltaic panel 40 and base 46, so that electrical components are better cooled without getting heated by the sun.

Figure 9:
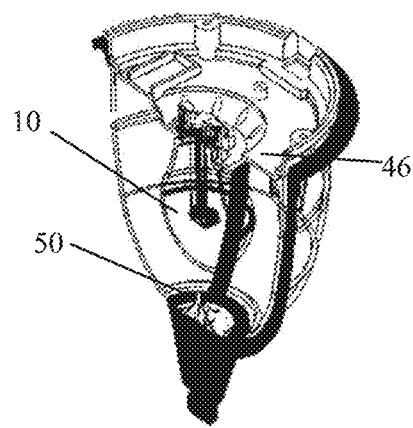
FIG. 9 is a simplified perspective illustration of reflectors in the lamp, in accordance with a non-limiting embodiment of the present invention.

As seen in FIG. 9, a first reflector 50, such as a conical or parabolic reflector, may be provided in light fixture 32 to reflect light from LEDs 12 to a second reflective surface 52 (FIG. 8), such as a reflective surface on the underside of base 46.

It is noted that in alternative embodiments, instead of solar power, the LEDs may be powered by AC or DC power from mains or other sources, with appropriate adaptors, inverters, rectifiers, converters, etc., as needed.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A lamp comprising:
a light fixture mounted on a pole, said light fixture comprising a transparent or translucent housing;
a solar energy collecting portion mounted on said light fixture, said solar energy collecting portion comprising a top solar photovoltaic panel and side solar photovoltaic panels for collecting and converting incident solar energy to electricity;
an electrical power source mounted on said solar energy collecting portion;
at least one LED light bulb mounted on a base, said base providing electrical connection from said solar photovoltaic panels to said electrical power source, and from said electrical power source to said at least one LED light bulb, wherein said at least one LED light bulb comprises LED lights mounted on a planar top surface of a substrate provided with electrical wiring and housed in a transparent or translucent bulb enclosure, said substrate being mounted at one end of a slender stem, whose opposite end extends from an end portion of said LED light bulb, and wherein electrical wires are disposed through said stem to electrically connect said LED lights to said electrical power source, and wherein at least one of said LED lights is mounted perpendicular to said top surface and projects light outwards parallel to said top surface, and at least one of said LED lights is mounted parallel to said top surface, and is positioned radially inwards with respect to said at least one of said LED lights that is mounted perpendicular to said top surface, and projects light outwards perpendicular to said top surface, and a first reflector arranged to reflect light from said LED lights to a second reflective surface.

2. The lamp according to claim 1, wherein said top solar photovoltaic panel is generally horizontal.

3. The lamp according to claim 1, wherein said side solar photovoltaic panels are slanted to face a majority of sunlight that impinges thereon during a day.

4. The lamp according to claim 1, wherein said light fixture is static and said side solar photovoltaic panels constantly face in different directions.

5. The lamp according to claim 1, further comprising an intermediate substrate disposed in said solar energy collecting portion between said top solar photovoltaic panel and said base.

6. The lamp according to claim 5, wherein said intermediate substrate serves as a thermal-insulating barrier between said top solar photovoltaic panel and said base.

7. A lamp comprising:
a light fixture comprising a transparent or translucent housing;

an electrical power source;

at least one LED light bulb mounted in said light fixture and in electrical connection with said electrical power source, wherein said at least one LED light bulb comprises LED lights mounted on a planar top surface of a substrate provided with electrical wiring, said substrate being mounted at one end of a slender stem, and wherein electrical wires are disposed through said stem to electrically connect said LED lights to said electrical power source, and wherein at least one of said LED lights is mounted perpendicular to said top surface and projects light outwards parallel to said top surface, and at least one of said LED lights is mounted parallel to said top surface, and is positioned radially inwards with respect to said at least one of said LED lights that is mounted perpendicular to said top surface, and projects light outwards perpendicular to said top surface, and a first reflector arranged to reflect light from said LED lights to a second reflective surface.

8. The lamp according to claim 1, wherein the LED lights that are mounted perpendicular to said top surface and which project light outwards parallel to said top surface comprise a plurality of LED lights mounted at east, south, west and north positions.

9. The lamp according to claim 7, wherein the LED lights that are mounted perpendicular to said top surface and which project light outwards parallel to said top surface comprise a plurality of LED lights mounted at east, south, west and north positions.

10. The lamp according to claim 1, wherein said first reflector is conical or parabolic reflector and said second reflective surface is underneath said base.

11. The lamp according to claim 7, wherein said at least one LED light bulb is mounted on a base, and said first reflector is conical or parabolic reflector and said second reflective surface is underneath said base.

* * * * *